United States Patent [19]

Izumikawa et al.

[11] Patent Number: 5,630,554
[45] Date of Patent: May 20, 1997

[54] METHOD OF SEPARATING AND RECOVERING VALUABLE METALS AND NON-METALS FROM COMPOSITE MATERIALS

[75] Inventors: Chiaki Izumikawa, Tokyo; Hiroyuki Iwata, Ryugasaki; Shigehisa Endoh; Hitoshi Ohya, both of Tsukuba, all of Japan

[73] Assignees: Dowa Mining Co., Ltd.; Jiro Hiraishi, both of Tokyo, Japan

[21] Appl. No.: 391,344

[22] Filed: Feb. 21, 1995

[51] Int. Cl.⁶ .................................................. B02C 23/10
[52] U.S. Cl. .................. 241/24.13; 241/24.18; 241/29; 241/DIG. 31
[58] Field of Search ................. 241/24.13, 24.14, 241/24.15, 24.18, 24.25, 24.28, 29, 79, 79.1, 14, DIG. 31; 209/3, 695

[56] References Cited

U.S. PATENT DOCUMENTS

| | | | |
|---|---|---|---|
| 3,672,500 | 6/1972 | Hayes | 209/695 |
| 5,139,203 | 8/1992 | Alavi | 241/24.14 X |
| 5,217,171 | 6/1993 | Feldman | 241/24.14 X |
| 5,279,464 | 1/1994 | Giegerich et al. | 241/24.14 X |

FOREIGN PATENT DOCUMENTS

| | | |
|---|---|---|
| 218486 | 8/1990 | Japan . |
| 170276 | 6/1994 | Japan . |

*Primary Examiner*—Mark Rosenbaum
*Attorney, Agent, or Firm*—Frishauf, Holtz, Goodman, Langer & Chick, P.C.

[57] ABSTRACT

To insure that rejects or scraps of composite materials such as printed wiring boards that consist of the mixture of metal and non-metal parts are separated into the metal and non-metal components with good precision so that both components can be recovered as recyclable valuables, the composite materials are broken into pieces by means of a shearing machine or the like and the pieces are thereafter ground with a hammer mill or the like to form a mixed powder consisting of metal and non-metal particles, which mixed powder is then fed continuously on to a belt conveyor inclined at an angle with respect to a line perpendicular to the direction of travel, whereby the metal particles are efficiently separated from the non-metal particles; the recovered metal particles being fed to an electrostatic separator to obtain higher grade of concentration by removing the non-metal inclusions.

20 Claims, 3 Drawing Sheets

METHOD OF SEPARATING AND RECOVERING VALUABLE METALS AND NON-METALS FROM COMPOSITE MATERIALS

BACKGROUND OF THE INVENTION

This invention relates to the separation and recovery of valuable metals from metal and non-metal composite materials such as printed wiring boards (in particular, their rejects and scraps) that are extensively used in the field of industrial electronics. More specifically, the invention relates to a method that comprises grinding such composite materials under specified conditions, separating spherical metal particles from non-spherical resins and other non-metal components by shape separation, and recovering either the metal particles or the resins or the like or both as valuables to be recycled.

Printed wiring boards using epoxy-glass substrates are produced in large quantities in the electronic industry and, accordingly, lots of scraps and rejects occur in their production line. Such scraps and rejects of printed wiring boards are composed of glass fibers and plastics as the substrate materials and metals such as copper, nickel, gold and silver in the circuit patterns. Because of this mixed nature, scrap and rejected printed wiring boards are not only difficult to grind but also the heat-setting property of the plastics makes the remelting approach impractical. Therefore, the scraps and rejects of printed wiring boards are in most cases disposed of in the form of a landfill without being recycled.

If the printed wiring board to be treated has patterned layers of valuable metals such as copper and nickel applied in thicknesses greater than 30 μm or if it has thinner layers of more expensive noble metals such as gold, silver and palladium, only the metals can be recovered by an existing technology that involves surface etching. However, this technology requires wastewater treatment facilities to recover valuable metals and, furthermore, the substrates that remain after their recovery have to be managed either by land disposal in the form of a landfill or by incineration. In the former case, the resins of which the substrates are formed will not corrode in the soil and in the latter case noxious gases such as hydrogen chloride, hydrogen bromide and dioxin will evolve to increase the management cost. The technology has no effective means to provide a complete solution to these problems As disclosed in Unexamined Published Japanese Patent Application (kokai) Hei 2-218486, entitled "A method of recovering metallic copper from the shredder dust or scrap of printed circuit boards", a technique has been proposed that comprises the steps of shredding a scrap composite material with a shearing machine, reducing its size with a grinder, and separating out the metal by specific density on a suitable device such as a vibrating table. However, no complete separation can be achieved between the metal and the resins, etc.

In commonly assigned Unexamined Published Japanese Patent Application (kokai) Hei 6-170276, entitled "A method of separating and recovering valuables from composite materials", the applicant proposed a method comprising the steps of breaking a composite material of interest into pieces by a suitable means such as a shearing machine, grinding the pieces by a suitable means such as a hammer mill to form a mixed powder consisting of metal and non-metal particles, and passing the mixed powder through either an eddy-current separator or an electrostatic separator or both so that the metal particles are separated from the non-metal particles. However, later studies have shown that this method is still imperfect in that the recovered metal particles contain a small amount of the non-metal particles.

The present invention has been accomplished under these circumstances and has as an object providing a method in which a composite material is ground within a specified range of peripheral speed and in which the fine particles thus obtained are passed through a specified separator, whereby the valuable metal component is separated efficiently from the non-metal component consisting of resins, glass fivers, etc.

SUMMARY OF THE INVENTION

The present inventors conducted intensive studies in order to attain the above-described object and found that when a scrap composite material was ground to particles of 1.0 mm or smaller and separated into the metal and non-metal components as two single entities, the difference in shape between the two components that resulted from the difference in malleability could be utilized to insure that the near-spherical particles of the valuable metal would be separated efficiently from the non-metal particles which were far from being spherical.

Thus, according to its first aspect, the invention provides a method of separating and recovering valuables from a composite material that comprises the steps of:

(1) breaking by shear a composite material consisting of a metal and a non-metal part to coarse particles not larger than 10 mm;

(2) grinding said coarse particles in a rotary grinding machine at a peripheral speed of not lower than 30 m/s, thereby separating them into metal and non-metal particles not larger than 1 mm:

(3) then charging said ground particles into a classifier to remove extremely fine particles out of the system; and (4) feeding continuously the ground particles obtained in the third step onto an inclined belt conveyor and guiding the spherical metal particles and non-spherical non-metal particles in such a way that the former are moved down the inclination of the belt conveyor whereas the latter stay on the belt and are transported in the direction of its travel, whereby the former are recovered as separated from the latter.

According to its second aspect, the invention provides a method of separating and recovering valuables from a composite material that comprises the steps of:

(1) breaking by shear a composite material consisting of a metal and a non-metal part to coarse particles not larger than 10 mm;

(2) grinding said coarse particles in a rotary grinding machine at a peripheral speed of not lower than 30 m/s, thereby separating them into metal and non-metal particles each in the form of simple substance and not larger than 1 mm;

(3) then charging said ground particles into a classifier to remove extremely fine particles out of the system;

(4) continuously feeding the ground particles obtained in the third step onto an inclined belt conveyor and guiding the spherical metal particles and non-spherical non-metal particles in such a way that the former are moved down the inclination of the belt conveyor whereas the latter stay on the belt and are transported in the direction of its travel, whereby the former are recovered as separated from the latter; and (5) feeding the recovered metal particles to an electrostatic separator so that the non-metal inclusions are separated from the metal particles.

DETAILED DESCRIPTION OF THE INVENTION

Figure 1:
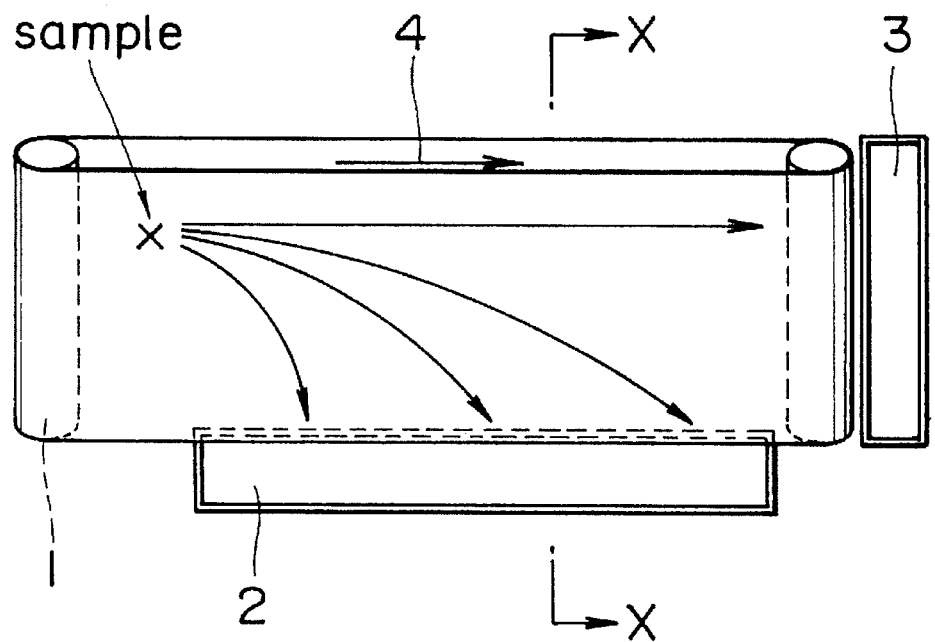
FIG. 1 is a plan view of a belt conveyor that may be used in the method of the invention.

The composite material to be treated by the method of the invention may be of any kind and a typical example is a printed wiring board. It should, however, be noted that not only scraps and cuttings of epoxy-glass substrates but also any other forms of composite materials that consist of resins and metals can be treated by the method of the invention.

The method starts with cutting or coarsely grinding the composite material to squares of ca. 1 cm or smaller by a suitable means such as a shearing machine. Thereafter, the square chips are reduced in size to 1.0 mm and less with a rotary grinder such as a hammer mill. The grinding machine is preferably operated at a peripheral speed of not lower than 30 m/s, with the range 50–85 m/s being more preferred. If the peripheral speed is less than 30 m/s, the metal particles cannot be rendered to assume a satisfactory spherical shape and the separation from the non-metal component in a subsequent step will be incomplete. On the other hand, if the peripheral speed is more than 100 m/s, even the non-metal component consisting of resins and glass will be rendered to have a spherical shape.

As a result of the grinding step, the more malleable metal part is reduced to particles in a near-spherical shape whereas the plastic and glass fiber parts are ground to tabular and acicular particles. The thus obtained product of the grinding operation is a mixture of the particles of valuable metals and the resin particles and need be subjected to a subsequent separating step.

In the next step, the mixture of ground particles is charged into a dry cyclone classifier and the group of very fine particles that will interfere with a subsequent separation step are drawn out of the system by means of a filter. Since the fine particles are mostly composed of resins and glass fibers, they may be disposed of as wastes in a separate step and the mixture that is retained is subjected to the subsequent separating step by means of a belt conveyor.

In the next step, the mixture of the remaining ground particles is supplied continuously on to a belt conveyor (see FIGS. 1 and 2) that is inclined at an angle with respect to a line normal to the direction of travel of said mixture, whereupon the particles are carried forward as they roll down the inclined belt conveyor 1. Those particles which roll down at the greater speed are dumped at the shorter distance whereas those which roll down at the smaller speed are dumped further ahead. On the other hand, the particles that are not rotating are dumped into the head portion 3 which is at the farthest end of the belt conveyor in the direction of its travel 4. The speed at which the particles roll down the belt conveyor increases as their shape approaches sphericity or their size or density increases. Hence, the metal particles which have these characteristics will drop at the shorter distance but most of the plastics and glass fibers will be dumped in the head portion of the belt conveyor.

The inclined belt conveyor may typically be made of a polyurethane conductive belt that can be supplied with a voltage of 5–10 volts in the travel zone and which develops a surface resistance of $10^4$ ohms. If the angle of inclination of the conveyor and the belt speed are set at appropriate values, the metal particles can be separated from the non-metal particles with high precision.

In the last step, which is optional, the fine non-metal particles that may have mixed with the metal particles are separated out by means of a separator (eddy-current separator and/or electrostatic separator). In separation with an eddy-current separator, external magnetic fields induce eddy currents in the conducting particles in the powder mixture and they are then affected by the magnetic fields to repel the metal particles, which hence are knocked off and separated from the non-conducting resin particles. If the ground particles are coarse, the separation is preferably performed by means of an electrostatic separator which is used either individually or in combination with an eddy-current separator. In separation with an electrostatic separator, the conducting particles are knocked off by electrostatic repulsion so that they can be separated from the non-conducting resin particles with high precision.

The following examples are provided for the purpose of further illustrating the present invention but are in no way to be taken as limiting.

EXAMPLE 1

An epoxy-glass substrate having copper circuit patterns formed on both sides was broken into square chips of ca. 1 cm by means of a shearing machine (step 1).

Then, the chips were reduced to sizes of ca. 1 mm and smaller by means of a hammer mill, which was rotated at a constant peripheral speed of 52 m/s so that the individual particles would be composed of substantially single substances (step 2). The substrate consisted of 30 wt % copper, 18 wt % glass fibers and 52 wt % cured epoxy resin.

Subsequently, fine particles were removed by means of a dry cyclone classifier to insure that the efficiency of separation in the next step would be enhanced. Fortunately, metals such as copper would not be easily reduced to fine particles and little of them was contained in the group of the fine rejects (step 3).

Figure 2:
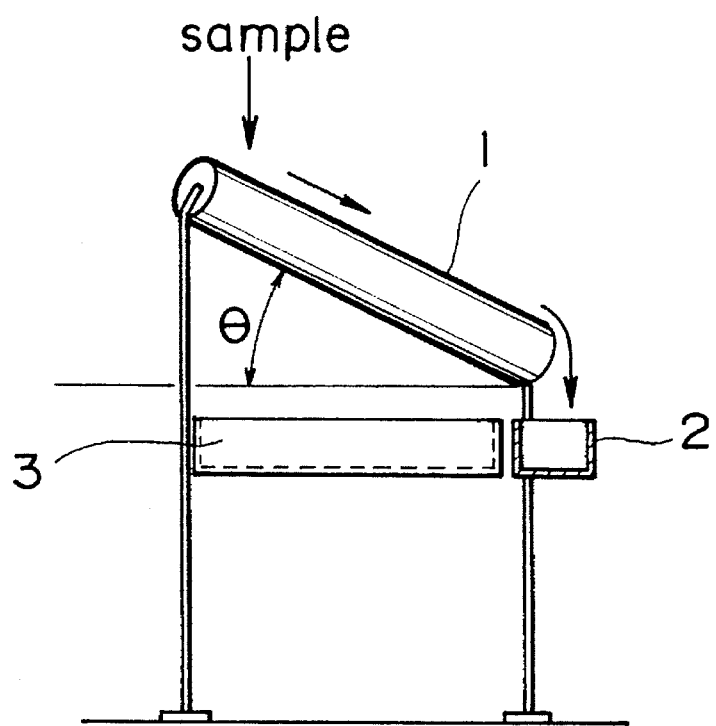
FIG. 2 is a section of FIG. 1 as taken on line X—X.
Figure 3:
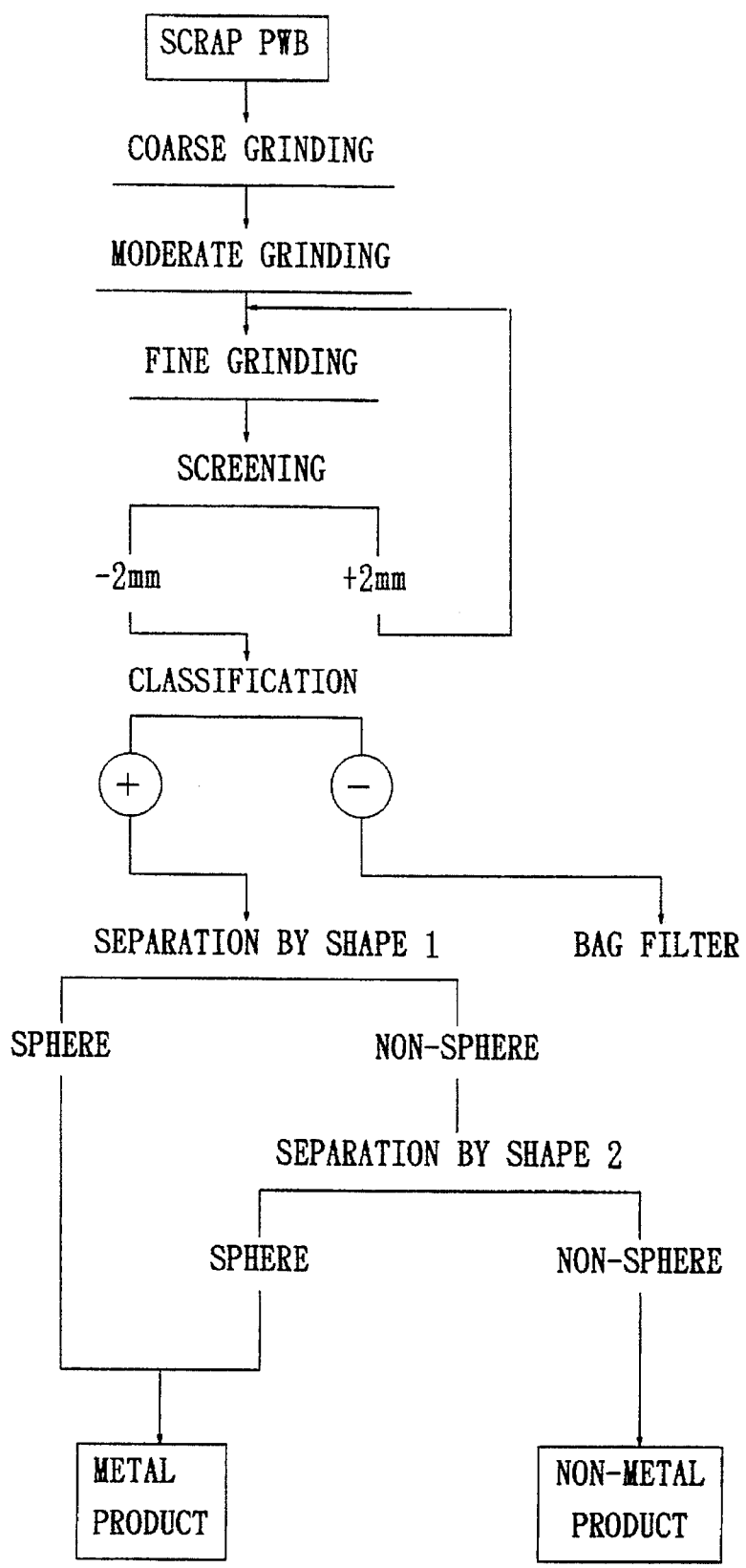
FIG. 3 is a flowsheet of the method of the invention as exemplified by Example 1.
Figure 4:
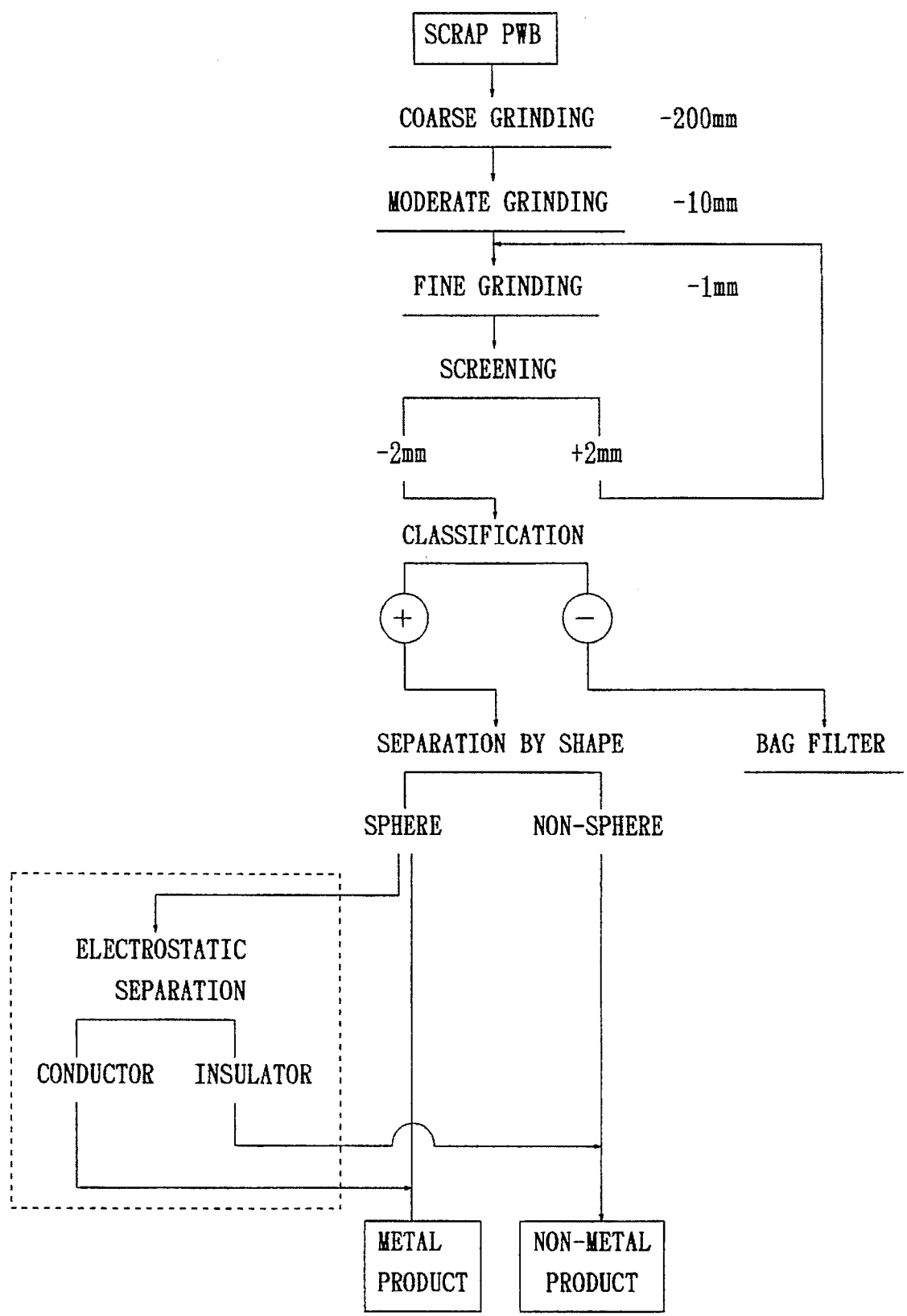
FIG. 4 is a flowsheet of the method of the invention as exemplified by Example 2.

In the next step, the thus classified particles were supplied on to a polyurethane belt conveyor indicated by 1 in FIGS. 1 and 2. The belt width of the conveyor was 250 mm and it was inclined at an angle of 25 degrees. The belt speed was 180 mm/sec. As the belt was running with a voltage of 8 volts being applied to the running zone and with a resistance of $10^4$ ohms developing on the surface, the particles that were chiefly composed of the copper particles which turned spherical in the grinding step were rolled down the belt to be recovered into a product recovery box 2 provided along a lateral side of the belt conveyor, whereas the non-metal particles were dumped into the head portion 3 at the farthest end of the belt conveyor.

Since not only the non-metal particles but also copper particles of the smaller size were contained in the head portion of the belt conveyor, another separation was done on a belt conveyor that was inclined at an angle of 25 degrees and which was running at a belt speed of 400 mm/sec, whereby the small copper particles were recovered into the box 2 to provide a higher percent recovery of copper. The non-metal particles collected in the head portion of the belt conveyor were combined with the group of particles that had been concentrated in the same head portion in step 1 and the combined particles were recovered as the non-metal product.

The two products, one being the metal part and the other being the non-metal part, which were recovered by the sequence of treatment steps were analyzed to determine their grades and the percent recovery of copper. The results are shown in Table 1, from which one can see that the copper grade of the metal product was 72.5% and the copper recovery in it was 95.1%.

TABLE 1

| Product | Amount (wt %) | Cu content (%) | Percent distribution of Cu |
| --- | --- | --- | --- |
| Ground product | 100.0 | 43.0 | 100.0 |
| Metal part | 56.4 | 72.5 | 95.1 |
| non-metal part | 43.6 | 4.8 | 4.9 |

EXAMPLE 2

An epoxy-glass substrate that had copper circuit patterns formed on both sides and which was of the same composition as shown in Example 1 was similarly broken into squares chips of ca. 1 cm by means of a shearing machine (step 1). The chips were ground with a hammer mill at a peripheral speed of 79 m/s so that they were separated into metal and non-metal particles that were not larger than ca. 1 mm (step 2). Then, fine particles were removed by means of a dry cyclone classifier (step 3).

The ground particles thus obtained were supplied on to a polyurethane belt conveyor that was inclined at 35 degrees. The belt width of the conveyor was 250 mm and the belt speed was 180 mm/sec. As the belt was running with a voltage of 7 volts being applied to the running zone and with a resistance of $10^4$ ohms developing on the surface, the spherical copper particles were rolled down the belt to be recovered into the product recovery box provided along a lateral side of the belt conveyor, whereas the non-metal particles were dumped into the head portion at the farthest end of the belt conveyor (step 4).

Subsequently, the spherical particles obtained in the previous step were supplied into an electostatic separator so that the copper particles that had mixed with the group of fine particles were separated for recovery. The electrostatic separator was high-tension Model 1014 of mixed type which was available from Nippon Elys Magnetic Co., Ltd. In this separator, the copper particles were charged positively under an applied voltage of 40,000 volts so that they were repelled from the positively charged grounded roll, thereby separating from the plastics and glass fibers which had been deposited electrostatically on the grounded roll. The particles electrostatically deposited on the charged grounded roll and composed of cured epoxy resin and glass fibers were scraped off by means of a brush or a scraper to fall into the box placed directly under the grounded roll. The thus separated copper particles had a grade of 85.3% (step 4).

The two products, one being the metal part the other being the non-metal part, which were recovered by the sequence of treatment steps were analyzed to determine their grades and the percent recovery of copper. The results are shown in Table 2, from which one can see that the copper grade of the metal was 85.3% and the copper recovery in it was 92.8%.

TABLE 2

| Product | Amount (wt %) | Cu content(%) | Percent distribution of Cu |
| --- | --- | --- | --- |
| Ground product (coarse particles) | 100.0 | 43.8 | 100.0 |
| Product of shape separation (spherical particles) | 63.6 | 66.1 | 95.9 |
| Final metal part | 47.7 | 85.3 | 92.8 |
| Final non-metal part | 52.3 | 6.0 | 7.2 |

As will be understood from the foregoing description, the methods of the present invention adopt simple means and yet not only the valuable metal in composite materials such as scrap printed wiring boards can be recovered as high-purity products but also the non-metal substances can be selectively recovered. Thus, in addition to the recyclability of the valuable metals, the invention permits the recovered non-metal valuables to be used effectively as fillers in resin structures or the like.

What is claimed is:

1. A method of separating and recovering valuable metals and non-metals from a composite material that comprises:
   (a) breaking into coarse particles by shearing a composite material comprising a metal and a non-metal part;
   (b) grinding said coarse particles from step (a) in a rotary grinding machine at a peripheral speed of 100 m/s to not less than 30 m/s, thereby separating said particles into spherical metal particles and non-spherical non-metal particles;
   (c) charging said ground particles from step (b) into a classifier to remove extremely fine particles; and
   (d) continuously feeding the ground particles obtained in step (c) onto an inclined belt conveyor and guiding the spherical metal particles and the non-spherical non-metal particles in such a way that the spherical metal particles are moved down the inclination of the inclined belt conveyor, whereas the non-spherical non-metal particles stay on the inclined belt conveyor and are transported in the direction of their travel, whereby the spherical metal particles are separated and recovered from the non-spherical non-metal particles.

2. The method according to claim 1 wherein said composite material consisting of a metal and non-metal part is selected from the group consisting of printed wiring boards, rejects of printed wiring boards and scraps of printed wiring boards.

3. The method according to claim 2 wherein said printed wiring boards comprise an epoxy-glass substrate.

4. The method according to claim 3 wherein said printed wiring boards comprise said substrate and a circuit pattern of a metal selected from the group consisting of copper, nickel, gold and silver.

5. The method according to claim 4 wherein said wiring boards comprise an epoxy-glass fiber substrate having a copper circuit pattern.

6. The method according to claim 1 wherein said printed wiring boards comprise a glass fibers and plastic substrate and a circuit pattern of a metal selected from the group consisting of copper, nickel, gold and silver.

7. The method according to claim 6 wherein said wiring boards comprise an epoxy-glass fiber substrate having a copper circuit pattern.

8. The method according to claim 7 wherein in step (b) the peripheral speed is 50 to 85 m/s.

9. The method according to claim 1 wherein in step (a), the composite material is broken into coarse particles not larger than 10 mm, and in step (b), the particles are ground to a size not larger than 1 mm.

10. The method according to claim 9 wherein in step (b), the peripheral speed is 50 to 85 m/s.

11. A method of separating and recovering valuable metals and non-metals from a composite material that comprises:

(a) breaking into coarse particles by shearing a composite material comprising a metal and a non-metal part;

(b) grinding said coarse particles from step (a) in a rotary grinding machine at a peripheral speed of 100 m/s to not less than 30 m/s, thereby separating said particles into spherical metal particles and non-spherical non-metal particles;

(c) charging said ground particles from step (b) into a classifier to remove extremely fine particles;

(d) continuously feeding the ground particles obtained in step (c) onto an inclined belt conveyor and guiding the spherical metal particles and the non-spherical non-metal particles in such a way that the spherical metal particles are moved down the inclination of the inclined belt conveyor, whereas the non-spherical non-metal particles stay on the inclined belt conveyor and are transported in the direction of their travel, whereby the spherical metal particles are separated and recovered from the non-spherical non-metal particles; and (e) feeding the recovered spherical metal particles from step (d) to an electrostatic separator so that non-metal inclusions are separated from the spherical metal particles.

12. The method according to claim 11 wherein said composite material consisting of a metal and non-metal part is selected from the group consisting of printed wiring boards, rejects of printed wiring boards and scraps of printed wiring boards.

13. The method according to claim 12 wherein said printed wiring boards comprise an epoxy-glass substrate.

14. The method according to claim 13 wherein said printed wiring boards comprise said substrate and a circuit pattern of a metal selected from the group consisting of copper, nickel, gold and silver.

15. The method according to claim 14 wherein said wiring boards comprise an epoxy-glass fiber substrate having a copper circuit pattern.

16. The method according to claim 11 wherein said printed wiring boards comprise a glass fibers and plastic substrate and a circuit pattern of a metal selected from the group consisting of copper, nickel, gold and silver.

17. The method according to claim 16 wherein said wiring boards comprise an epoxy-glass fiber substrate having a copper circuit pattern.

18. The method according to claim 17 wherein in step (b) the peripheral speed is 50 to 85 m/s.

19. The method according to claim 11 wherein in step (a), the composite material is broken into coarse particles not larger than 10 mm, and in step (b), the particles are ground to a size not larger than 1 mm.

20. The method according to claim 19 wherein in step (b), the peripheral speed is 50 to 85 m/s.

* * * * *